United States Patent [19]

Silverstein

[11] Patent Number: 5,920,653
[45] Date of Patent: Jul. 6, 1999

[54] MULTIPLE SPATIAL CHANNEL PRINTING

[75] Inventor: D. Amnon Silverstein, Hayward, Calif.

[73] Assignee: Hewlett-Packard Company, Palo Alto, Calif.

[21] Appl. No.: 08/731,893

[22] Filed: Oct. 22, 1996

[51] Int. Cl.$^6$ .................................................. G06K 9/40
[52] U.S. Cl. ........................... 382/266; 382/256; 382/257
[58] Field of Search ..................................... 382/257, 266, 382/254, 256, 302, 304; 358/443, 447, 448, 465, 455, 456

[56] References Cited

U.S. PATENT DOCUMENTS

| 4,782,399 | 11/1988 | Sato ........................................... 358/443 |
| 5,276,532 | 1/1994 | Harrington ................................. 382/266 |

*Primary Examiner*—Thomas D. Lee

[57] ABSTRACT

A multiple spatial channel technique is described that can produce near continuous-tone output quality from an output device having a large, dilute dot channel, referred to as the L (lowpass) channel, and a small, concentrated dot channel, referred to as the N (noisy) channel. The new process described here overcomes contouring artifacts and produces vastly improved images over techniques that use only a single dot type. Given a matrix of image luminance values (raster), two images are computed for printing with the two channels of the printer. The two images are computed simultaneously with a two-pass algorithm, one pass horizontally and one pass vertically. Initially, the L channel image is set to be equal to the input image. Each adjacent pair of pixels in the original image is compared by calculating an edge contrast strength. If the ratio of the first pixel level to the second pixel level is larger than a threshold, the L channel pixel that corresponds to the second image pixel is set to the first pixel level. On the other hand, if the ratio of the second pixel level to the first pixel level is larger than the threshold, the L channel pixel that corresponds to the first image pixel is set to the second pixel level. This procedure erodes the dark sides of edges that have contrast above the specified threshold. Similarly, during the computation of the N channel image, each pixel in the input image is compared to its corresponding L channel image pixel. The corresponding N channel image pixel is set to be the ratio of the input image pixel to the L channel pixel. The technique is extensible to multiple sizes of large dilute dots and can be combined with image resolution techniques. The separation technique can also be used for display, and has several advantages over the prior art including low noise, low computational expense and low bandwidth requirements.

12 Claims, 8 Drawing Sheets

MULTIPLE SPATIAL CHANNEL PRINTING

BACKGROUND OF THE INVENTION

1. Field of the Invention

The present invention relates to digital image processing and, more particularly, to processing digital images using multiple spatial channels.

2. Description of the Related Art

It is possible to develop devices such as printers or displays that have the capacity to produce larger, lower density dots, in addition to the usual variety. Researchers have recently been developing printers that can produce dots with more than one spatial distribution of colorant. One example that is now in common use is a printer that can produce very small dots in addition to dots of the usual size, allowing resolution enhancement (RET). A new alternative is a printer that can produce dots that are larger than the usual size. For example, an experimental ink-jet pen has been developed that can produce two types of dots: small strongly pigmented dots and large dilutely pigmented dots. Researchers have created this device with the hope of reducing the visibility of the halftone pattern in bright image regions. Until now, however, there has been no method that successfully utilizes the new capacity to achieve this desired effect. A simple substitution of the large dilute dots for the small concentrated dots in the highlight areas introduces contouring, and only serves to reduce image quality.

Thus, it can be seen that single dot size image processing techniques impose output quality limits upon current multiple dot sized devices, and hinder the use of these devices in many applications.

Therefore, there is an unresolved need for a technique that can produce near continuous-tone output quality from a multiple dot size device by overcoming contouring artifacts and thereby producing vastly improved images over techniques that use only a single dot type.

SUMMARY OF THE INVENTION

A multiple spatial channel technique is described that can produce near continuous-tone output quality from an output device having a large, dilute dot channel, referred to as the L (lowpass) channel, and a small, concentrated dot channel, referred to as the N (noisy) channel. The new process described here overcomes contouring artifacts and produces vastly improved images over techniques that use only a single dot type.

Given a matrix of image luminance values (raster), two images are computed for printing with the two channels of the printer. The two images are computed simultaneously with a two-pass algorithm, one pass horizontally and one pass vertically.

The L image channel is computed in the following manner: Initially, the L channel image is set to be equal to the input image. Each adjacent pair of pixels in the original image is compared by calculating an edge contrast strength. If the ratio of the first pixel level to the second pixel level is larger than a threshold, the L channel pixel that corresponds to the second image pixel is set to the first pixel level. On the other hand, if the ratio of the second pixel level to the first pixel level is larger than the threshold, the L channel pixel that corresponds to the first image pixel is set to the second pixel level. This procedure erodes the dark sides of edges that have contrast above the specified threshold.

A similar method is used to calculate the N channel image. During the computation of the N channel image, each pixel in the input image is compared to its corresponding pixel in the L channel image. The corresponding N channel image pixel is set to be the ratio of the input image pixel to the L channel pixel.

The multiple spatial channel technique is extensible in many ways. It is not necessary for there to be only two channels, multiple sizes of large dilute dots can be employed. It is also possible to combine the multiple channel spatial printing techniques with image resolution techniques. Moreover, the multichannel separation technique described herein can also be used for display, rather than printing.

Multiple channel spatial separation has several advantages over the prior art including low noise, low computational expense and low bandwidth requirements.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–7. Those skilled in the art will readily appreciate that the detailed description given herein with respect to these figures is for explanatory purposes, however, because the invention extends beyond these limited embodiments.

Figure 1:
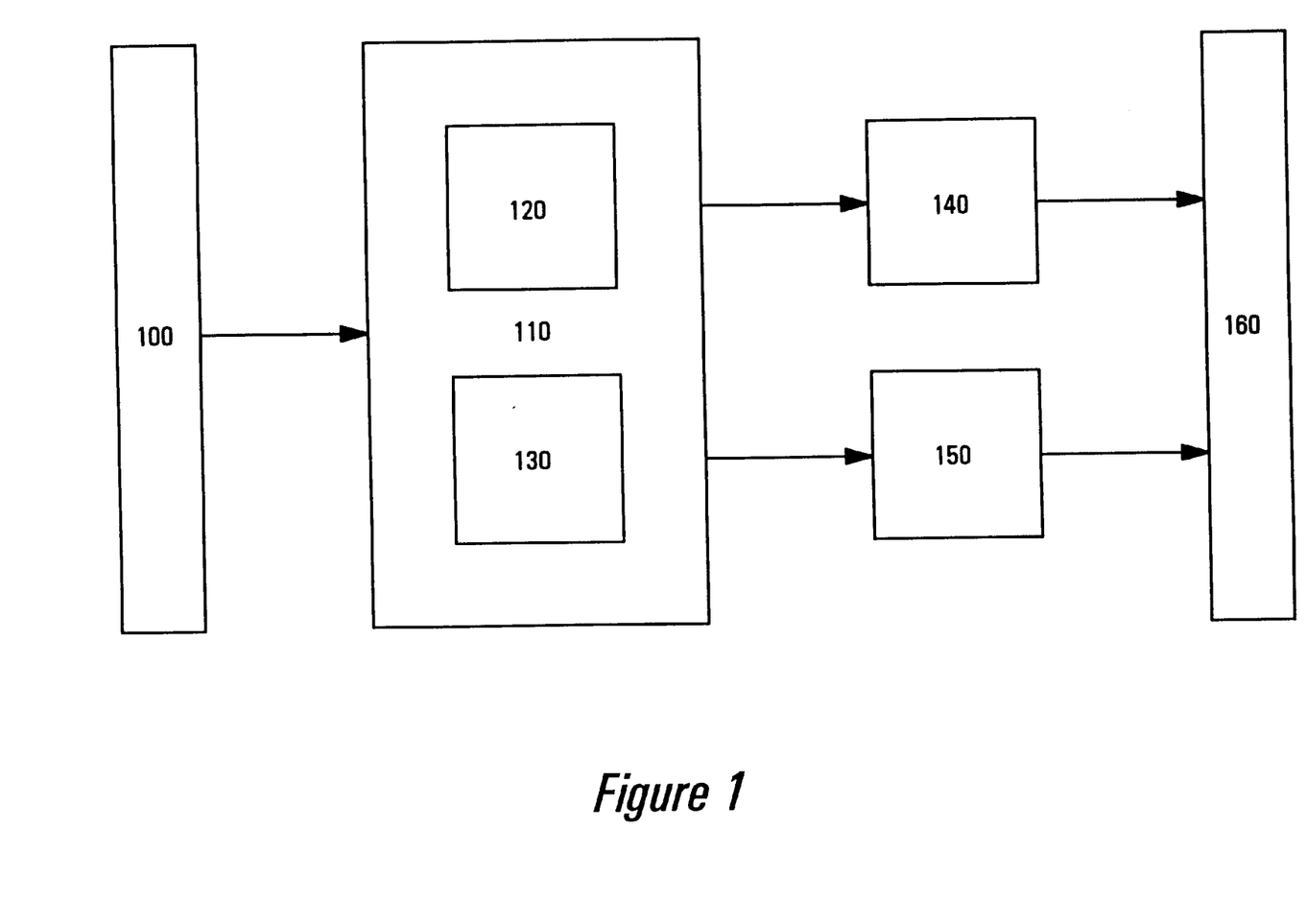
FIG. 1 is a block diagram illustrating an apparatus for processing and displaying a digital image using multiple sized dots according to the present invention.

FIG. 1 is a block diagram illustrating an apparatus for processing and displaying a digital image using multiple sized dots according to the present invention. In FIG. 1, digital image 100 is processed by a multiple spatial channel processor 110. Multiple spatial channel processor 110 separates digital image 100 into two (or more) spatial channels. Each of the multiple spatial channels is produced using an image production device suitable for its associated particular spatial channel. The multiple channel images are combined to form an output image 160.

Thus, for the embodiment of FIG. 1, the original image is decomposed into two spatial channels by multiple spatial channel processor 110. More specifically, multiple channel processor 110 has two channel extractors, 120 and 130, and respective channel-associated image generators, 140 and 150. For this embodiment, channel extractor 120 extracts an image channel from image 100 that is made up of large, dilute dots. Similarly, channel extractor 130 extracts an image channel from image 100 that is made up of small, concentrated dots. Herein the large, dilute dot channel will be referred to as the L (lowpass) channel, and the small, concentrated dot channel will be referred to as the N (noisy) channel.

Figure 2A:
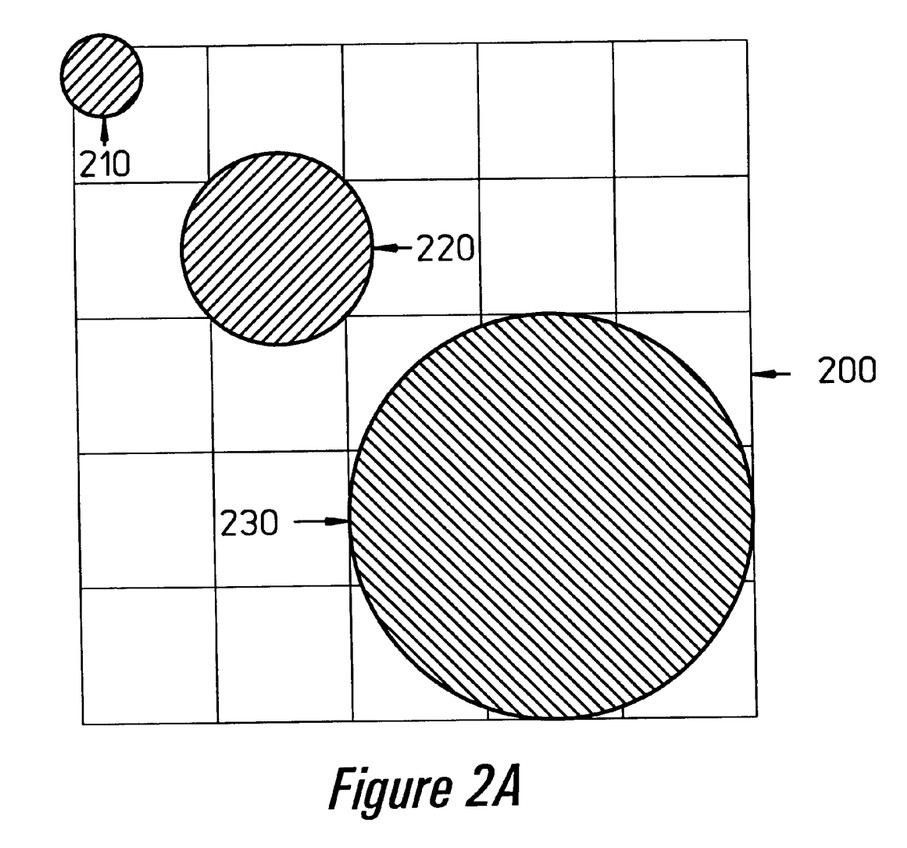
FIGS. 2A and 2B are drawings that together illustrate multiple-sized output dots as practiced according to one embodiment of the present invention.
Figure 2B:
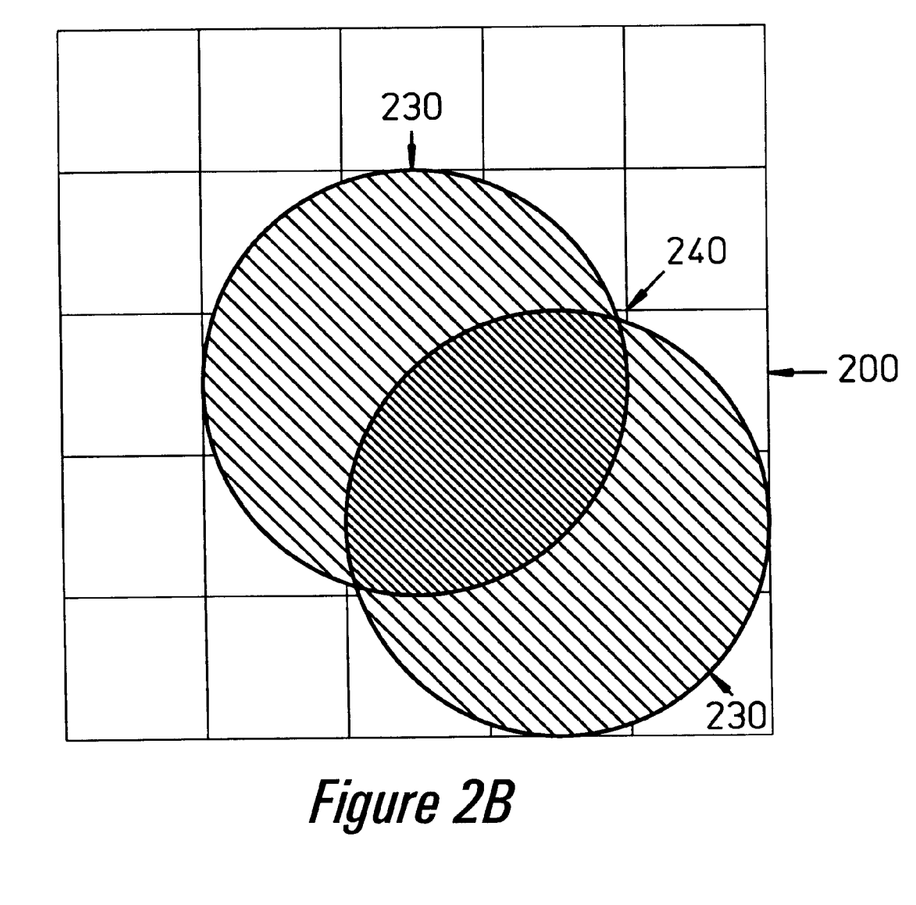

FIGS. 2A and 2B are drawings that together illustrate multiple-sized output dots as practiced according to one embodiment of the present invention. A pixel-sized raster grid 200 is shown in FIGS. 2A and 2B. That is, each small square of grid 200 corresponds to a pixel of digital image 100 of FIG. 1. Dot 220 of FIG. 2A is approximately the same size as a pixel of grid 200 and is produced at the positional resolution of image 100. Dot 220 is suitable for use as the small, concentrated dots of the N channel.

Dot 210 of FIG. 2A is smaller than a pixel and is produced at a positional resolution higher than that of image 100. Dots of the size of dot 210 can be used for resolution enhancement, as is known in the art. Thus, dot 210 can fill a gap between dots such dot 220 to form a smooth edge between the larger dots.

In contrast to dot 210, dot 230 is larger and lighter than dot 220. Dot 230 is produced the same positional resolution of dot 220, but dot 230 extends further from a pixel-sized square boundary of grid 200 than does dot 220. Dot 230 is suitable for use as a large, dilute dot of the L channel. Dots, such as dot 230, combine together to form dark regions where they overlap. Thus, FIG. 2B illustrates that intersection region 240 is darker than portions of the dots 230 that are not part of the intersection region 240.

Although the resolution enhancement dot 210 is shown in FIG. 2A as being approximately one quarter the size of the N channel dot 220, which is in turn approximately one ninth the size of the L channel dot 230, these particular proportions are not required to practice the present invention.

Similarly, the exact shape and distribution of the dots as shown in FIG. 2A is not required to practice the present invention. Thus, for example, dot 230 need not be a circular disk, as shown in FIG. 2A. Thus, for an alternate embodiment, dot 230 has a Gaussian distribution. For another alternate embodiment, dot 230 is asymmetric.

Furthermore, multiple sizes of large dilute dots can be employed, it is not necessary for there to be only two channels. It is also possible to combine the multiple channel spatial printing techniques with image resolution techniques.

Moreover, although the description is being presented within the context of dots produced upon a medium such as paper, alternate embodiments are possible. For example, L channel dots can be produced by an inkjet that disperses multiple dots in the manner of a showerhead. Alternately, a two step printing process can be employed wherein the L channel dots are printed upon wet paper, thereby introducing a blur, and then the N channel dots are printed in a second pass after the paper has dried. For yet another embodiment, in a laser printer environment, L channel dots can be produced by a defocused laser beam.

The multichannel separation technique described herein can also be used for display, rather than printing. For example, multiple pixels of a display device such as a liquid crystal display device can be ganged together to form L channel dots on the display. Alternately, for a projection display, a first projector can display the N channel and a second projector can be defocused to display the L channel.

Figure 3:
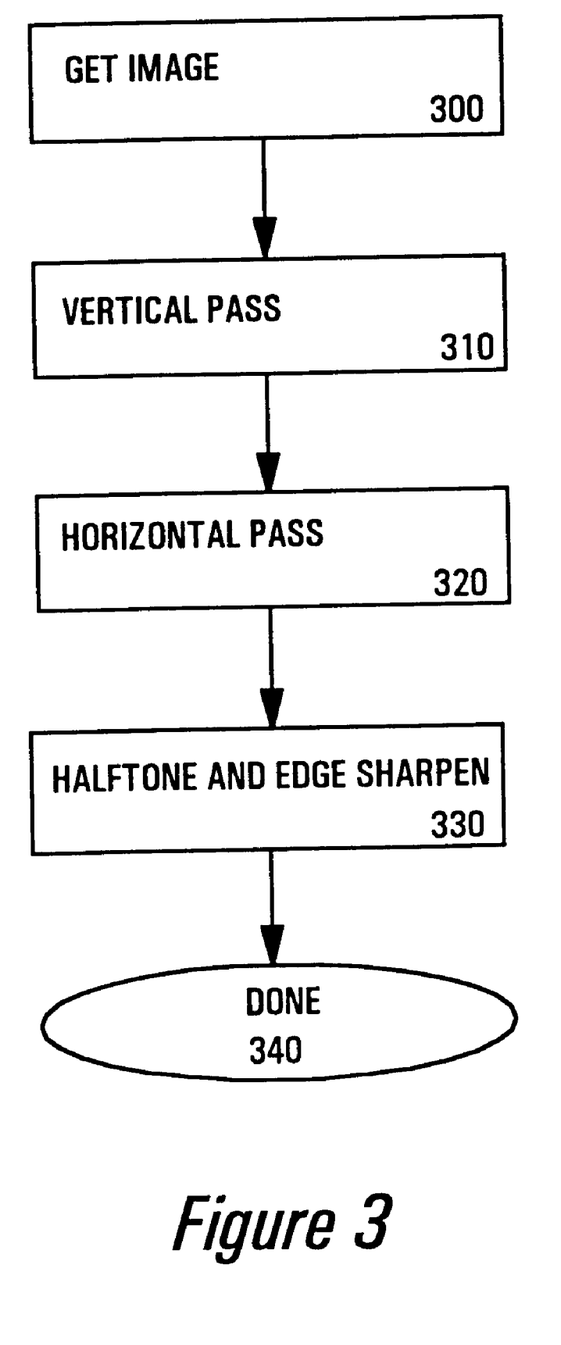
FIG. 3 is a flow chart illustrating multiple spatial channel processing of a digital image as practiced according to one embodiment of the present invention.
Figure 4:
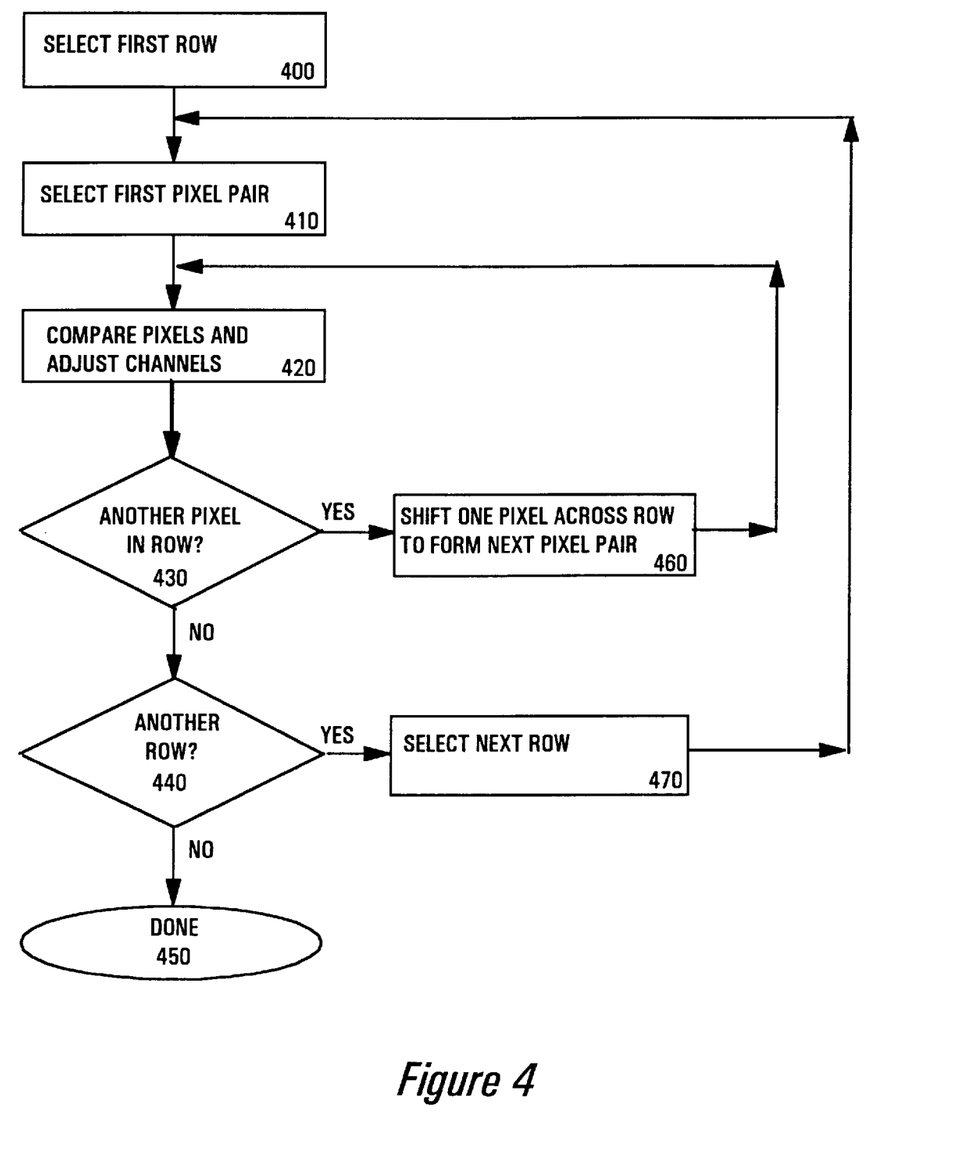
FIG. 4 is a flow chart illustrating a vertical pass for the multiple channel processing of a digital image as practiced according to one embodiment of the present invention.
Figure 5:
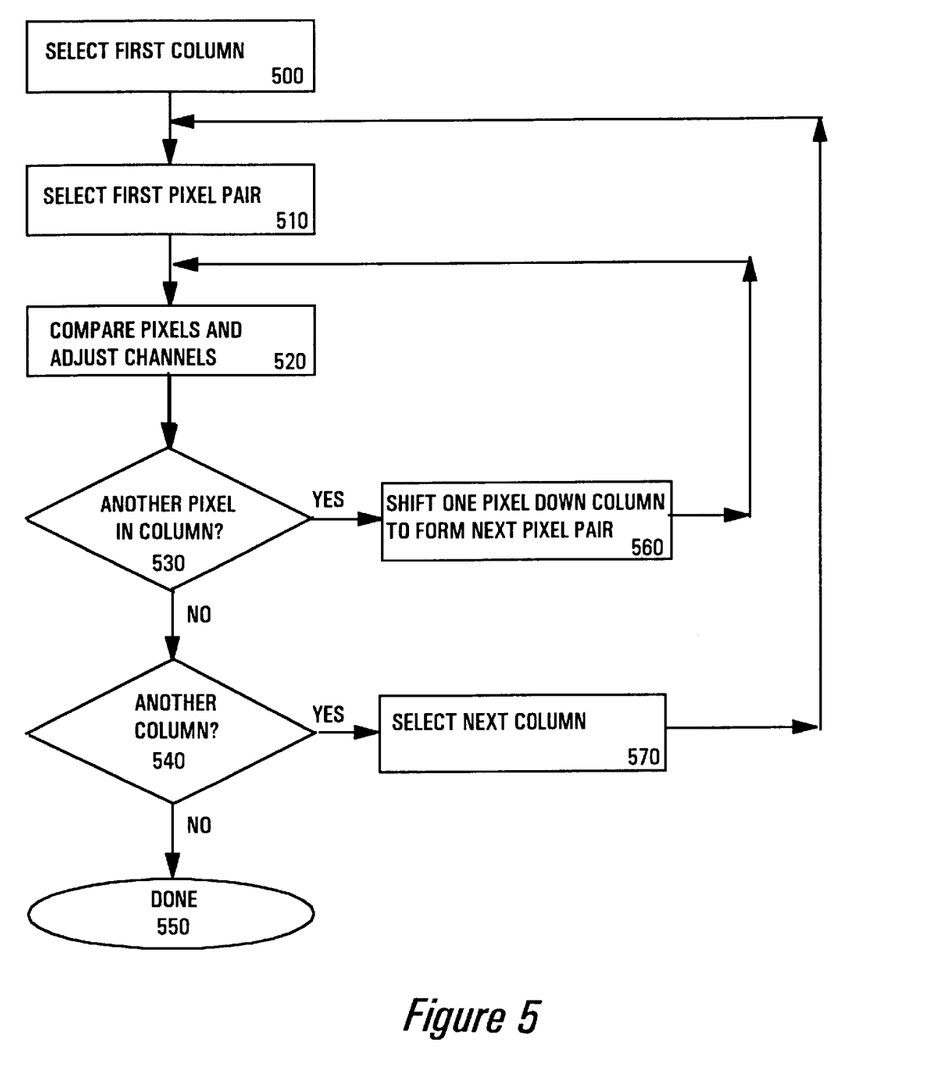
FIG. 5 is a flow chart illustrating a horizontal pass for the multiple channel processing of a digital image as practiced according to one embodiment of the present invention.
Figure 6:
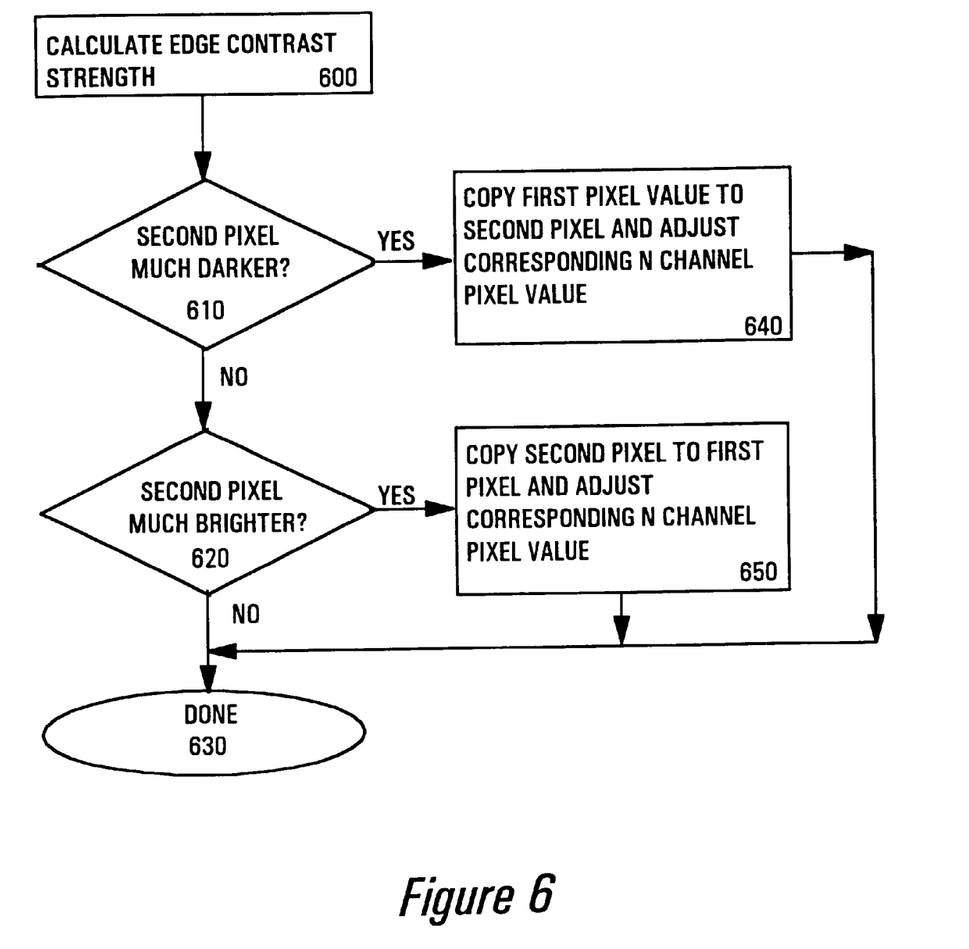
FIG. 6 is a flow chart illustrating separation of a pixel pair into multiple channels for the multiple channel processing of a digital image as practiced according to one embodiment of the present invention.

FIG. 3 is a flow chart illustrating multiple spatial channel processing of a digital image as practiced according to one embodiment of the present invention. In FIG. 3, it can be seen that the image to process is first retrieved (process 300). The image is then separated into multiple channels using vertical and horizontal passes (processes 310 and 320, respectively). FIG. 4 illustrates the vertical pass, FIG. 5 illustrates the horizontal pass and FIG. 6 illustrates the decomposition into multiple channels during the horizontal and vertical passes. Finally, if desired, the multiple channels are halftoned and edge sharpened (process 330) before termination 340.

Thus, given a matrix of image luminance values (raster), two images are computed for printing with the two channels of the printer. The two images are computed simultaneously with a two-pass algorithm, one pass horizontally and one pass vertically. The channels are computed so that N×L=I, where I is the original image.

Given a matrix of image luminance values (raster), two images are computed for printing with the two channels of the printer. The two images are computed simultaneously with a two-pass algorithm, one pass horizontally and one pass vertically.

The L image channel is computed in the following manner: Initially, the L channel image is set to be equal to the input image. Each adjacent pair of pixels in the original image is compared by calculating an edge contrast strength. If the ratio of the first pixel level to the second pixel level is larger than a threshold, the L channel pixel that corresponds to the second image pixel is set to the first pixel level. On the other hand, if the ratio of the second pixel level to the first pixel level is larger than the threshold, the L channel pixel that corresponds to the first image pixel is set to the second pixel level. This procedure erodes the dark sides of edges that have contrast above the specified threshold, i.e., it is a "contrast thresholded erosion" procedure.

A similar method is used to calculate the N channel image. During the computation of the N channel image, each pixel in the input image is compared to its corresponding pixel in the L channel image. The corresponding N channel image pixel is set to be the ratio of the input image pixel to the L channel pixel.

The threshold value must be larger than or equal to 1, and can be determined experimentally with the output device. If the threshold is set too small, too much noise will be added to the image. If the threshold is too large, the N channel will be underutilized and the image will suffer from blur. For an alternate embodiment wherein the channels are being used in a projection device, light edge erosion can be performed by using a threshold less than 1.

Furthermore, as described previously, the entire original image is buffered locally by initially copying the original image to the L channel image. Alternately, the local buffer size can be reduced by only buffering the original image pixel values being compared during the edge erosion step.

Figure 7:
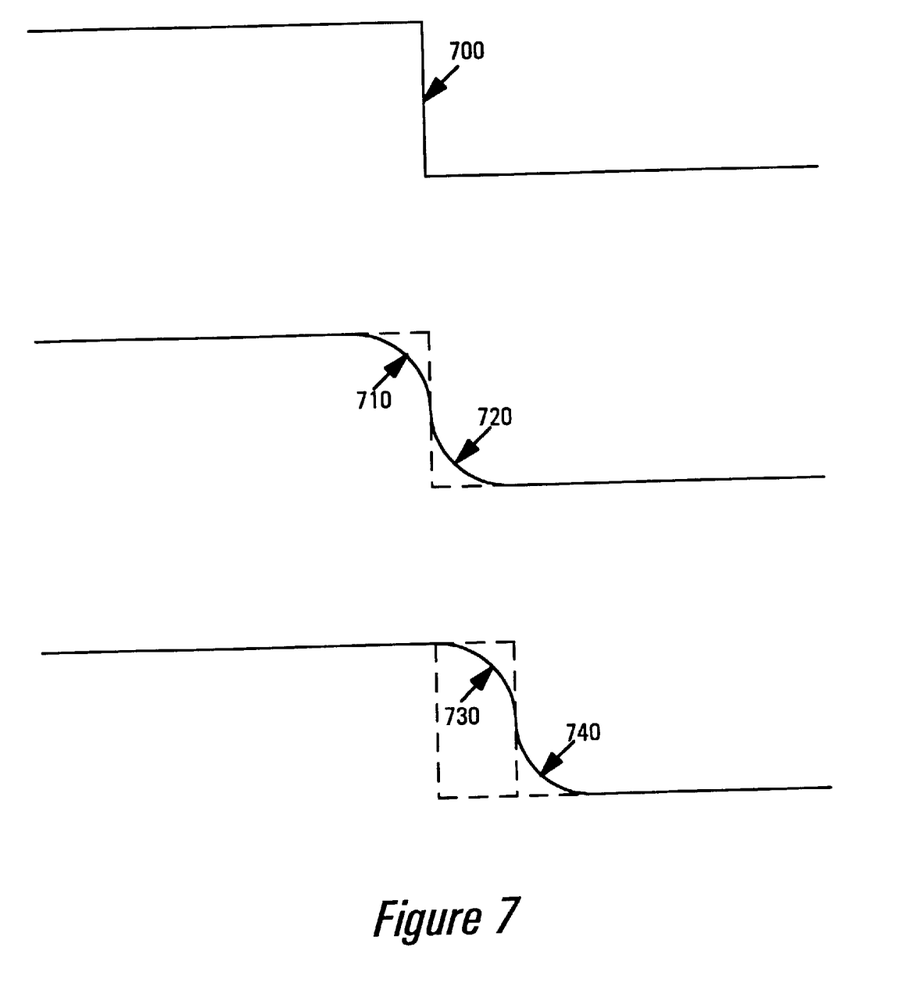
FIG. 7 illustrates a contrast threshold erosion process performed as part of the multiple channel processing of a digital image as practiced according to one embodiment of the present invention.

FIG. 7 illustrates a contrast threshold erosion process performed as part of the multiple channel processing of a digital image as practiced according to one embodiment of the present invention. FIG. 7 shows reflectance as a function of direction in space (e.g., along a row or column) wherein there is a contrast transition 700. To produce the desired transition 700 without contrast threshold erosion by supplementing the L channel with the N channel, it would be necessary to add black in region 710 and to add white in region 720. However, this is not possible to add white using a scheme wherein only black dots are added to white paper. The pixel value copying portion of the contrast threshold erosion process has the effect of moving the edge so that the region 730 can be supplemented by black dot. The region 740, on the other hand, does not need to be supplemented by white.

Returning now to FIG. 4, a flow chart illustrating a vertical pass for the multiple channel processing of a digital image as practiced according to one embodiment of the present invention is presented. The first row of the image to be processed is selected in process 400 and the first pixel pair of the row is selected in process 410. Within the context of the vertical pass of FIG. 4, a pixel pair is a pair of contiguous pixels in the selected row. The first pixel pair is selected to be the first and second pixels from one end of the row. The vertical pass decomposition into multiple spatial channels is achieved in process 420 when the pixels within the selected pixel pair are compared and, if necessary, their values are adjusted.

In decision block 430 a test is performed to determine whether there is at least one more pixel in the selected row. If there is another pixel in the row, a shift by one pixel across the row is performed in process 460 to form the next selected pixel pair.

If there is not another pixel in the row, then a test is performed in decision block 440 to determine whether there is at least one more row in the image. If there is another row in the image, a shift by one row in the image is performed in process 470 to form the next selected row.

Processing terminates at terminal 450 when all rows have been processed.

Similarly, FIG. 5 is a flow chart illustrating a horizontal pass for the multiple channel processing of a digital image as practiced according to one embodiment of the present invention. The first column of the image to be processed is selected in process 500 and the first pixel pair of the column is selected in process 510. Within the context of the horizontal pass of FIG. 5, a pixel pair is a pair of contiguous pixels in the selected column. The first pixel pair is selected to be the first and second pixels from one end of the column. The horizontal pass decomposition into multiple spatial channels is achieved in process 520 when the pixels within the selected pixel pair are compared and, if necessary, their values are adjusted.

In decision block 530 a test is performed to determine whether there is at least one more pixel in the selected column. If there is another pixel in the column, a shift by one pixel down the column is performed in process 660 to form the next selected pixel pair.

If there is not another pixel in the column, then a test is performed in decision block 540 to determine whether there is at least one more column in the image. If there is another column in the image, a shift by one column in the image is performed in process 570 to form the next selected column.

Processing terminates at terminal 550 when all columns have been processed.

Returning to FIG. 6, a flow chart illustrating separation of a pixel pair into multiple channels for the multiple channel processing of a digital image as practiced according to one embodiment of the present invention is shown. The edge contrast strength is calculated in process 600.

In decision block 610, a test is performed to determine whether the second pixel is significantly darker than the first pixel of the pair. If the difference exceeds the threshold, then an adjustment to the L and N channel values is made in process 640.

In decision block 620, a test is performed to determine whether the second pixel is significantly brighter than the first pixel of the pair. If the difference exceeds the threshold, then an adjustment to the L and N channel values is made in process 650. Processing then terminates at terminal 630.

After the two image channels are computed, they are halftoned separately and printed together using the two hardware output channels. For the example, one can use a Floyd-Steinberg error diffusion halftone method (see R. W. Floyd and L. Steinberg, "Adaptive Algorithm for Spatial Grey Scale", SID Int. Sym. Digest of Tech Papers, 36–37, 1975), but other halftone methods will also work. If one so desires, it is also possible to sharpen the halftoned image.

For example, for one embodiment, the unsharpening effect of halftoning can be compensated for by means of a presharpening stage. See, for example, R. Ulichney, *Digital Halftoning,* MIT press, 1987. Typically, the continuous tone (contone) image is edge-enhanced before the halftoning and the presharpening stage utilizes a filtering operation such as the Laplacian filter (see G. Baxes, *Digital Image Processing,* Prentice-Hall Inc., 1984).

Alternately, a sophisticated strategy for reshaping the dots in clustered-dot dithers has been previously described by other researchers. See Rick A. Vander Kam, Ping Wah Wong, "Edge Enhancement for Clustered-Dot Halftones", Hewlett-Packard Laboratories Technical Report, 1994.

Furthermore, to improve the sharpness of the N channel, one can use a sharpening filter (see D. A. Silverstein, "A Post-Filter for Improving Halftone Image Sharpness", U.S. patent application Ser. No. 08/734,821; filed on the same date herewith, wherein a post-filtering method for increasing the high-frequency and edge information of halftoned images is described). If a contone image is processed by a halftoning algorithm into a binary or multilevel image, some of the high frequency information is lost. However, some of the lost information can be restored by judiciously rearranging some of the halftone picture elements (pixels).

The procedure can be applied as a post filter to any halftoned image, and can substantially improve the image quality. Each horizontally adjacent pair of pixels in the contone image are compared with each other. If the difference between their luminance is greater than the threshold, then the corresponding pair of adjacent pixels in the halftone image are compared. If the difference between the halftone image pixels has the opposite sign of the differences between the contone image pixels (e.g., the image changes from dark to light, but the halftone pixels change from light to black), the two halftone pixels are exchanged with each other. The procedure is then repeated in the vertical direction.

Multiple channel spatial printing has several advantages over the prior art. A first advantage is that of low noise. Multiple spatial channel printing prints all of the slowly varying image areas with a low-pass device that does not suffer from high frequency noise. This effectively removes common halftone artifacts such as highlight stipple, worms, and other undesirable texture. The noisy, sharp-dot mechanism is restricted for use in areas where there is high frequency image content that requires its use. These areas also provide good visual masking, so the high frequency noise is perceptually suppressed. Additionally, the high-frequency dither pattern is typically placed on a low-frequency background gray provided by the low-pass mechanism. This reduces the contrast of the noise, further reducing its visibility.

Another advantage is that of low computational expense. For the L channel, each horizontal and vertical pair of pixels requires one division and two comparisons. A small number of these require the copying of a value from one to the other. The result of the division is stored as the N channel, which then requires no further computation. The two channels can be computed simultaneously. The two outputs can be calculated on a piecewise basis, so that large image buffers are not required.

A third advantage is that of a low bandwidth requirement. Multiple spatial channel printing has nearly the perceptual fidelity of continuous tone representations, with only four output states per pixel. This is in contrast, for example, to an original image printed with 256 output states per pixel. In addition, both of the channels have low entropy and are highly amenable to data compression. Even simple compression can greatly reduce the bandwidth requirements of the two channels. Thus, because the L channel is a low pass channel, it can be subsampled without a great loss in signal. On the other hand, the N channel is sparse, lending itself to compression techniques such a run length encoding and decoding.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A multiple spatial channel separation method for a digital output device having a lowpass (L) channel of large, dilute dots and a noisy (N) channel of small, concentrated dots, the method comprising the steps of:

extracting an N channel image from an input image; and
   extracting an L channel image from the input image,
   wherein the L channel images are formed by eroding sides of edges in the input image that have contrast above a specified threshold and wherein the step of extracting the N channel image is computed in the following manner:

each pixel in the input image is compared to its corresponding L channel image pixel and the corresponding N channel image pixel is set to be the ratio of the input image pixel to the L channel pixel.

2. The method as set forth in claim 1, wherein the L channel images are formed by eroding light sides of edges in the input image that have contrast above a specified threshold.

3. The method as set forth in claim 1, wherein the L channel images are formed by eroding dark sides of edges in the input image that have contrast above a specified threshold.

4. The method as set forth in claim 1, wherein the step of extracting the L channel image is computed in the following manner:

the L channel image is initialized to the input image;
   adjacent pairs of the input image pixels are compared by calculating an edge contrast strength;
   if the ratio of the first pixel level to the second pixel level is larger than a threshold, the L channel pixel that corresponds to the second image pixel is set to the first pixel level; and
   if the ratio of the second pixel level to the first pixel level is larger than the threshold, the L channel pixel that corresponds to the first image pixel is set to the second pixel level.

5. A multiple spatial channel separation apparatus for a digital output device having a lowpass (L) channel of large, dilute dots and a noisy (N) channel of small, concentrated dots, the apparatus comprising:

means for extracting a N channel image from an input image; and
   means for extracting a L channel image from the input image,
   wherein the L channel images are formed by eroding sides of edges in the input image that have contrast above a specified threshold and wherein the means for extracting the N channel image operates in the following manner:

each pixel in the input image is compared to its corresponding L channel image pixel and the corresponding N channel image pixel is set to be the ratio of the input image pixel to the L channel pixel.

6. The apparatus as set forth in claim 5, wherein the L channel images are formed by eroding light sides of edges in the input image that have contrast above a specified threshold.

7. The apparatus as set forth in claim 5, wherein the L channel images are formed by eroding dark sides of edges in the input image that have contrast above a specified threshold.

8. The apparatus as set forth in claim 5, wherein the means for extracting the L channel image extracts the L channel image in the following manner:

the L channel image is initialized to the input image;
   adjacent pairs of the input image pixels are compared by calculating an edge contrast strength;
   if the ratio of the first pixel level to the second pixel level is larger than a threshold, the L channel pixel that corresponds to the second image pixel is set to the first pixel level; and
   if the ratio of the second pixel level to the first pixel level is larger than the threshold, the L channel pixel that corresponds to the first image pixel is set to the second pixel level.

9. A multiple spatial channel output device, comprising:

a lowpass (L) channel means for generating large, dilute dots;
   a noisy (N) channel means for generating small, concentrated dots;
   means for extracting a N channel image from an input image, the N channel image for output by the N channel means; and
   means for extracting a L channel image from the input image, the L channel means for output by the L channel means,
   wherein the L channel images are formed by eroding sides of edges in the input image that have contrast above a specified threshold and wherein the means for extracting the N channel image operates in the following manner:

each pixel in the input image is compared to its corresponding L channel image pixel and the corresponding N channel image pixel is set to be the ratio of the input image pixel to the L channel pixel.

10. The device as set forth in claim 9, wherein the L channel images are formed by eroding light sides of edges in the input image that have contrast above a specified threshold.

11. The device as set forth in claim 9, wherein the L channel images are formed by eroding dark sides of edges in the input image that have contrast above a specified threshold.

12. The device as set forth in claim 9, wherein the means for extracting the L channel images extracts the L channel image in the following manner:

the L channel image is initialized to the input image;

adjacent pairs of the input image pixels are compared by calculating an edge contrast strength;

if the ratio of the first pixel level to the second pixel level is larger than a threshold, the L channel pixel that corresponds to the second image pixel is set to the first pixel level; and if the ratio of the second pixel level to the first pixel level is larger than the threshold, the L channel pixel that corresponds to the first image pixel is set to the second pixel level.

* * * * *